United States Patent [19]
Hilton et al.

[11] Patent Number: 5,896,241
[45] Date of Patent: Apr. 20, 1999

[54] PLAIN CARBON STEEL HUB FOR DATA STORAGE DEVICE

[75] Inventors: Ronald L. Hilton, No. St. Paul; Gregory A. Laska, Woodbury; John W. Swanson, Mahtomedi, all of Minn.; Richard E. Domonkos, Avon, Conn.

[73] Assignee: Imation Corp., Oakdale, Minn.

[21] Appl. No.: 08/796,271

[22] Filed: Feb. 7, 1997

Related U.S. Application Data

[63] Continuation-in-part of application No. 08/692,942, Aug. 7, 1996, abandoned.

[51] Int. Cl.⁶ ............................................. G11B 5/82
[52] U.S. Cl. ............................................. 360/135
[58] Field of Search ................................ 360/133, 135

[56] References Cited

U.S. PATENT DOCUMENTS 5,139,700  8/1992  Miksic et al. ............... 252/389.54

FOREIGN PATENT DOCUMENTS

| | | |
|---|---|---|
| 0 233 644 | 8/1987 | European Pat. Off. . |
| 0 314 010 | 5/1989 | European Pat. Off. . |
| 0 592 872 A2 | 4/1994 | European Pat. Off. . |
| 63-014387 | 1/1988 | Japan . |

*Primary Examiner*—Robert S. Tupper
*Attorney, Agent, or Firm*—Eric D. Levinson

[57] ABSTRACT

A rotating removable data storage device hub, such as a hub for a micro-floppy magnetic data storage disc, that has a core of plain carbon steel and a primary coating. The hub may also include a vapor corrosion inhibiting layer on the primary coating. The plain carbon steel can have about 0.5% or less carbon. The primary coating can be tin, nickel, zinc, chrome, paints, epoxies, epoxy-urethanes, phenolic resins, and combinations thereof. The vapor corrosion inhibiting layer may include an amine to reduce the rate of oxidation of the plain carbon steel core.

35 Claims, 7 Drawing Sheets

PLAIN CARBON STEEL HUB FOR DATA STORAGE DEVICE

This application is a continuation-in-part of U.S. patent application Ser. No. 08/692,942 filed on Aug. 7, 1996 abandoned.

FIELD OF THE INVENTION

The present invention relates to the field of data storage devices. More particularly, the present invention relates to plain carbon steel hubs for rotating removable data storage devices.

BACKGROUND OF THE INVENTION

Typical removable data storage devices rely on rotation of the data storage media about a hub to record and read data. Examples of such removable devices include magnetic data storage discs, magnetic data storage tape cartridges, and magneto-optical discs.

Removable magnetic data storage discs typically include a polyester resin or the like having a magnetic layer on each side thereof on which information is recorded by a magnetic head. Flexible magnetic data storage discs which have a diameter of 3½ inches (90 mm) or less are known as micro-floppy discs and will be referred to so herein. Generally, the micro-floppy disc is accommodated in a hard casing to form a cartridge.

The flexible magnetic data storage disc comprises a thin circular magnetic recording medium having a hub at its center. The hub serves as a means of rotating the recording media over recording heads. Typical hubs are made of AISI/SAE 430/431 Stainless Steel because of its durability, corrosion resistance, and susceptibility to magnetic attraction. Some hubs are provided in uncoated stainless steel, while others have been coated with chrome or epoxy to enhance their appearance or wear properties.

The disc hub plays an important role in proper operation of the disc. FIG. 1 is an exploded view of a typical micro-floppy disc drive spindle 10 and hub 20, including an annular ring of magnetic media 21 attached to the hub 20. The drive spindle 10 includes a center pin 12 and alignment pin 14 that is spring-loaded to be biased away from the center pin 12. The center pin 12 is received in the center pin opening 22 of the hub 20 while the alignment pin is received in the alignment window 24.

FIG. 2 is a top view of the hub 20 properly mounted on a drive spindle 10 in which the center pin 12 of the drive 10 is received in the center pin opening 22 and the alignment pin 14 is properly located in the alignment window 24. As shown, the alignment pin 14 is urged towards the center pin 12 during rotation of the hub 20 (and attached recording media—not shown) by the window 24. The drive spindle 10 is typically magnetized to attract the hub 20 towards the drive 10 during loading and use of the disc. Although proper seating and orientation of the hub on the drive typically occurs without fault, there are a number of errors which can occur that cause errors in the writing or reading of data from the media.

FIG. 3 depicts one error that can occur in seating of the hub 20 on drive spindle 10. This error involves failure of the alignment pin 14 to properly seat in the alignment window 24 in hub 20. As shown, the alignment pin 14 has only moved partially towards its proper position in the corner of the window 24. This error prevents proper positioning of the recording media relative to the read/write heads in the disc drive. Errors of the this type are typically detected with a test commonly referred to as "Index to Data."

FIGS. 4 and 5 depict another error in seating of the hub 20 on the drive spindle 10. This error, referred to as a "mischuck," results in lifting of the hub 20 off of the drive spindle 10 in the area of the alignment pin 14. As a result, the hub 20 is canted on the drive spindle 10 and proper alignment of the media with respect to the read/write heads in the disc drive cannot be maintained. That improper alignment typically results in modulation errors as data is read from and written to the disc.

Similar concerns can plague manufacturers and users of other rotating removable data storage devices that incorporate a hub that mates with a spindle to rotate the data storage media, whether that media stores data magnetically or optically. Examples of such devices include removable magnetic data storage discs other than micro-floppy discs, removable magnetic data storage tape cartridges, and magneto-optical data storage discs.

Although the errors discussed above occur infrequently and are typically tested for by manufacturers of high quality removable data storage devices, any improvements that further reduce their incidence can be extremely valuable in terms of improved manufacturing yields in addition to increasing the reliability of the devices in use by purchasers.

SUMMARY OF THE INVENTION

The present invention provides a rotating removable data storage device having a hub of coated plain carbon steel. By using plain carbon steel for the hub a number of advantages are achieved by the present invention. The magnetic force generated between the drive spindle and the hub is typically increased, resulting in fewer mischucks. Also, the cost of the hubs is reduced because of the substitution of plain carbon steel for the stainless steel typically used. A coating over the plain carbon steel resists corrosion of the plain carbon steel hub and may also assist in preventing improper seating of the hub on the drive spindle. Additional vapor corrosion inhibiting layers may also improve the corrosion resistance for the coated plain carbon steel hubs.

In one aspect, the present invention provides a hub for a rotating removable data storage device having a core of plain carbon steel and a coating on at least a portion of the core. Preferably, the plain carbon steel comprises about 0.5% or less carbon, more preferably about 0.2% or less carbon. Some preferred coatings can be selected from the group consisting of tin, nickel, zinc, chrome, paints, epoxies, epoxy-urethanes, phenolic resins, and combinations thereof.

One hub according to the present invention is provided in a microfloppy magnetic data storage disc.

In another aspect, the present invention comprises a micro-floppy magnetic data storage disc having a hub with a core of plain carbon steel and a coating on at least a portion of the hub. Preferably, the plain carbon steel comprises about 0.5% or less carbon, more preferably about 0.2% or less carbon. Some preferred coatings can be selected from the group consisting of tin, nickel, zinc, chrome, paints, epoxies, epoxy-urethanes, phenolic resins, and combinations thereof.

In another aspect, the present invention comprises a hub for a rotating removable data storage device including a core comprising plain carbon steel; a primary coating on at least a portion of the core; and a vapor corrosion inhibiting layer on the primary coating. The vapor corrosion inhibiting layer may be an amine.

In another aspect, the present invention comprises a method of manufacturing a hub for a rotating removable data storage device comprising steps of forming a core of plain carbon steel; providing a primary coating on the core; and providing a vapor corrosion inhibiting layer on the primary coating. The step of providing the vapor corrosion inhibiting layer may include depositing the layer by aqueous solution, in vapor phase, or a combination of an aqueous solution and vapor phase deposition.

These and other features and advantages will be described in more detail below.

DETAILED DESCRIPTION OF THE INVENTION

The present invention provides a hub for rotating removable data storage devices that can reduce error in positioning the hub on a drive spindle by using a coated plain carbon steel hub that exhibits improved magnetic properties, resists corrosion and reduces the cost of manufacturing the hub. Although the following discussion focuses generally on hubs for micro-floppy magnetic data storage discs, it will be understood that the hubs according to the present invention may find use in connection with any rotating removable data storage device having a hub, whether that data is stored magnetically, optically, or in any other manner. Examples of such devices include, but are not limited to: any removable magnetic data storage disc, removable magnetic data storage tape cartridges, removable magneto-optical data storage discs, and digital video discs that may include a metallic hub.

FIGS. 1–5 described above depict the interface between a micro-floppy disc hub 20 and drive spindle 10. The design of the micro-floppy disc is subject to American National Standards Institute (ANSI) Standard x3.171-1989 and equivalents which are hereby incorporated by reference (equivalents include ISO/IEC 9529-1:1989 and European Computer Manufacturers Association ECMA/TC19/87/21) to allow interchangeable use of discs in different disc drives, both of which may be manufactured by many different companies. As a result, the dimensions of the hubs for such discs do not typically vary significantly between manufacturers. As described above, the typical hubs 20 are manufactured of stainless steel because of its durability and corrosion resistance. The stainless steel hubs are typically stamped from sheet stock to the desired shape.

The drive spindles 10 are typically remanently magnetized or include magnets in their construction to provide a magnetic attraction between the spindle and hub that tends to draw the hub against the spindle. Magnetic fields measured near the magnetic poles on commercially available drive spindles range from about 290 to about 550 Oe, with an average of about 400 Oe. These measurements were taken using a commercially available gaussmeter located near the poles of the magnets in the drive spindles.

Figure 1:
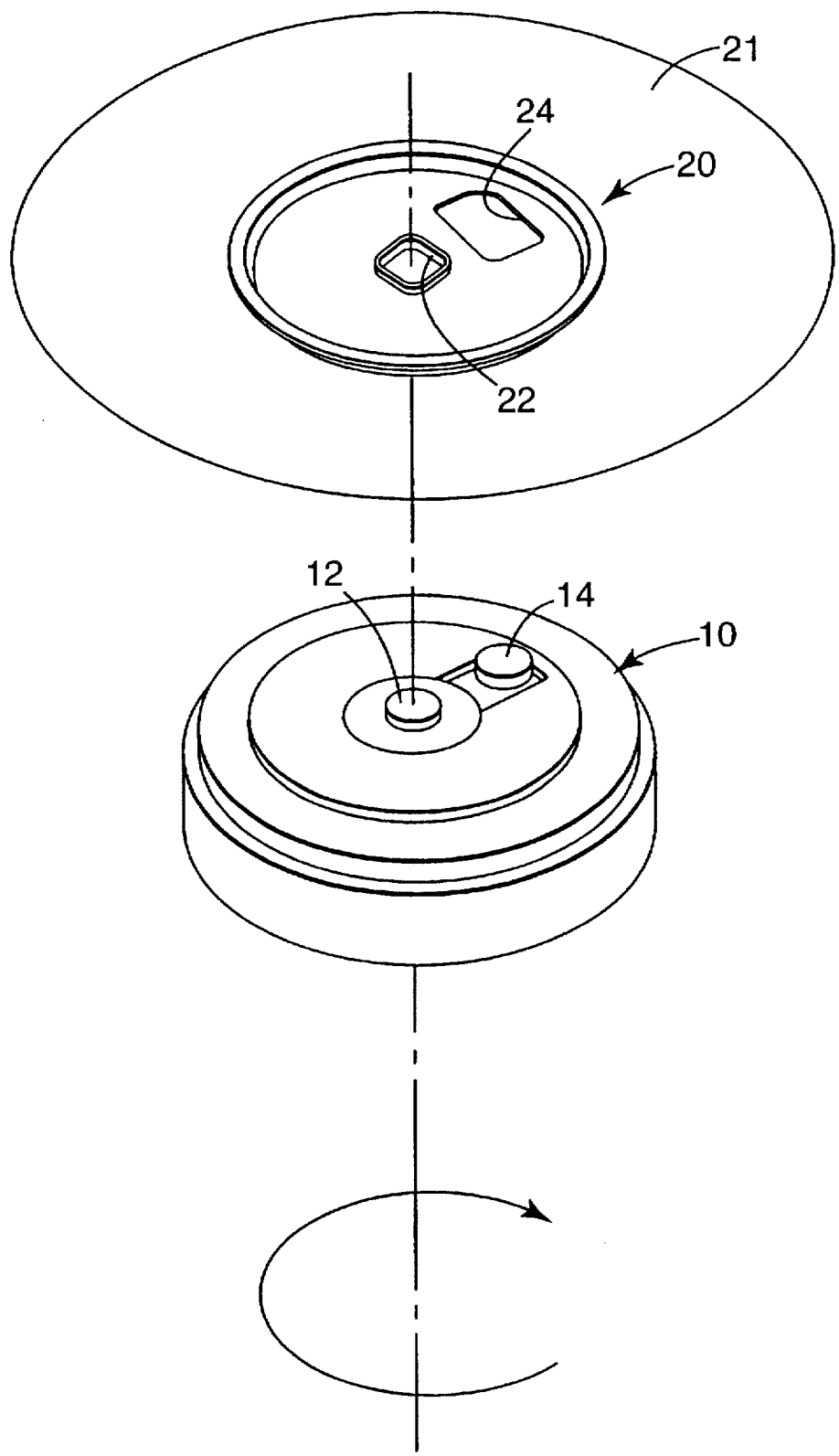
FIG. 1 is an exploded view of the interface between a microfloppy hub and drive spindle.
Figure 2:
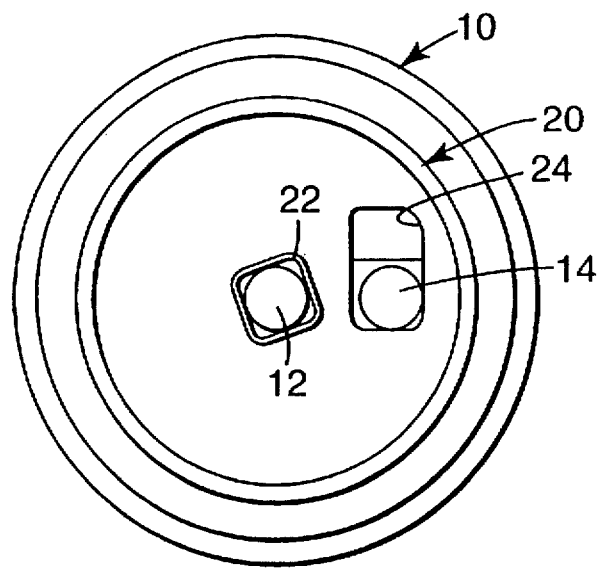
FIG. 2 is a plan view of a micro-floppy disc hub properly seated on a drive spindle.
Figure 3:
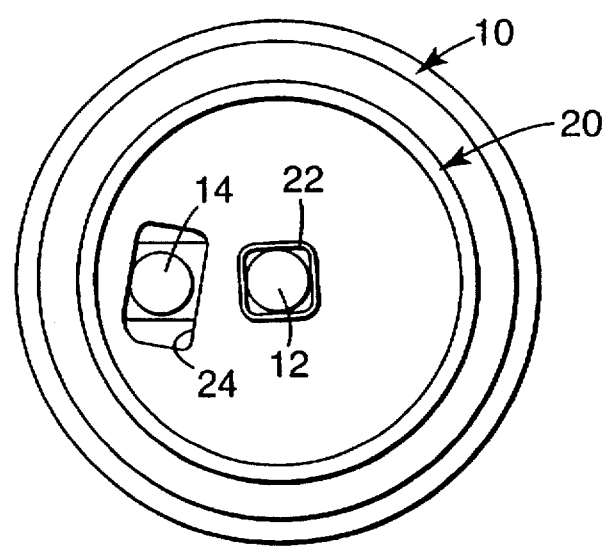
FIG. 3 is a plan view of a micro-floppy disc hub improperly seated on a drive spindle that typically results in an index to data error.
Figure 4:
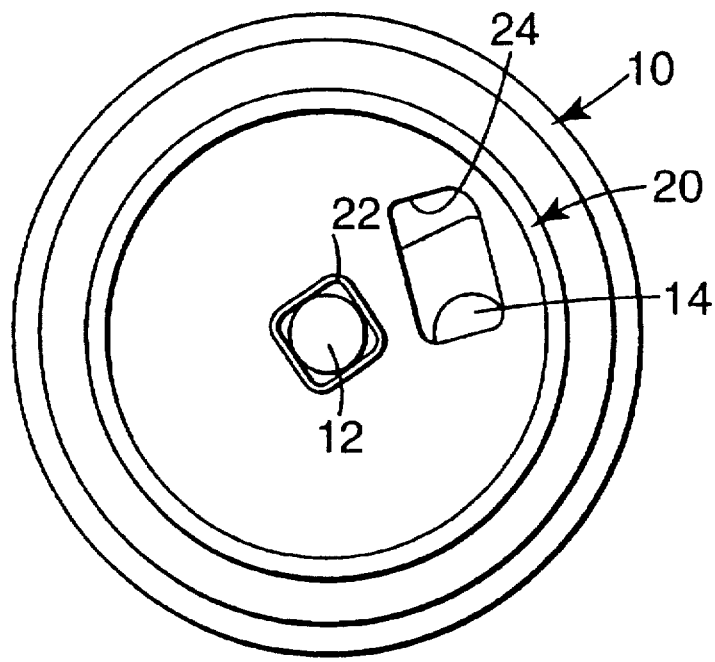
FIG. 4 is a plan view of a micro-floppy disc hub improperly seated on a drive spindle due to a mischuck that typically results in a modulation error.
Figure 5:
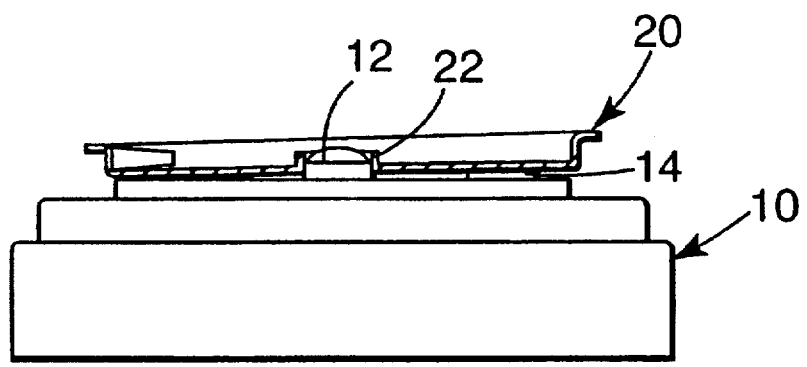
FIG. 5 is a side view of the micro-floppy disc hub and drive spindle of FIG. 4.
Figure 6:
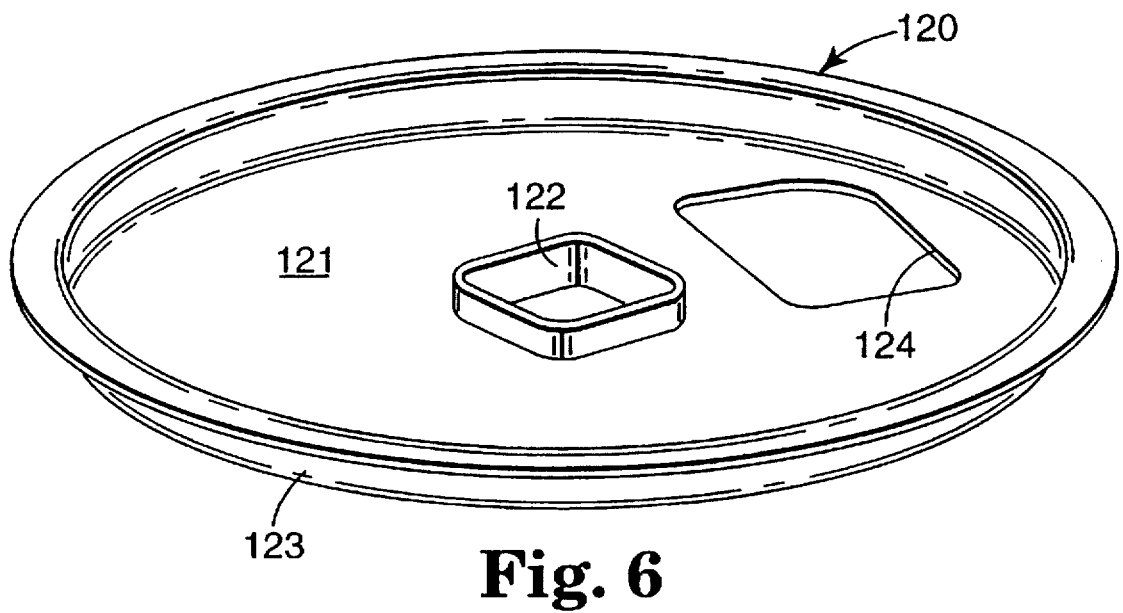
FIG. 6 is a perspective view of one micro-floppy disc hub according to the present invention.
Figure 7:
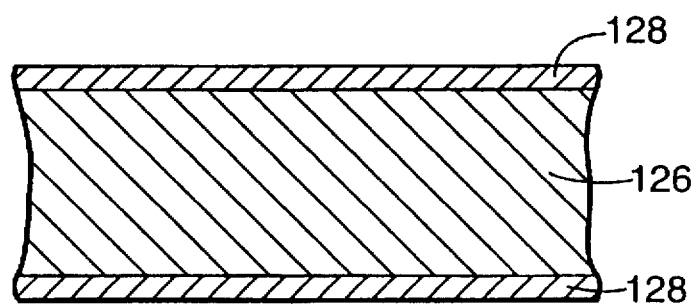
FIG. 7 is an enlarged partial cross-sectional view of the hub of FIG. 6.

FIG. 6 depicts a micro-floppy disc hub 120 including center pin opening 122 and alignment window 124. The hub can be manufactured by any suitable method, although typically the hub 120 will be manufactured by stamping procedures as are known stainless steel micro-floppy disc hubs. As seen in FIG. 7, the hub 120 includes a core 126 of plain carbon steel and a coating 128 over the core 126.

The core preferably comprises a plain carbon steel. As used herein, the term "plain carbon steel" does not include steels with significant alloying components (such as stainless steels). Preferably, plain carbon steels according to the present invention have about 0.5% carbon content or less (although it will be understood that the plain carbon steels must include at least some carbon). More preferably, hubs according to the present invention are manufactured with plain carbon steel having about 0.2% carbon content or less. Examples of suitable steels include, but are not limited to: AISI/SAE 1008, 1010, 1018 and 1020 steels. It is also preferred that the hubs be formed of cold-rolled plain carbon steel because of its strength and hardness.

Figure 8:
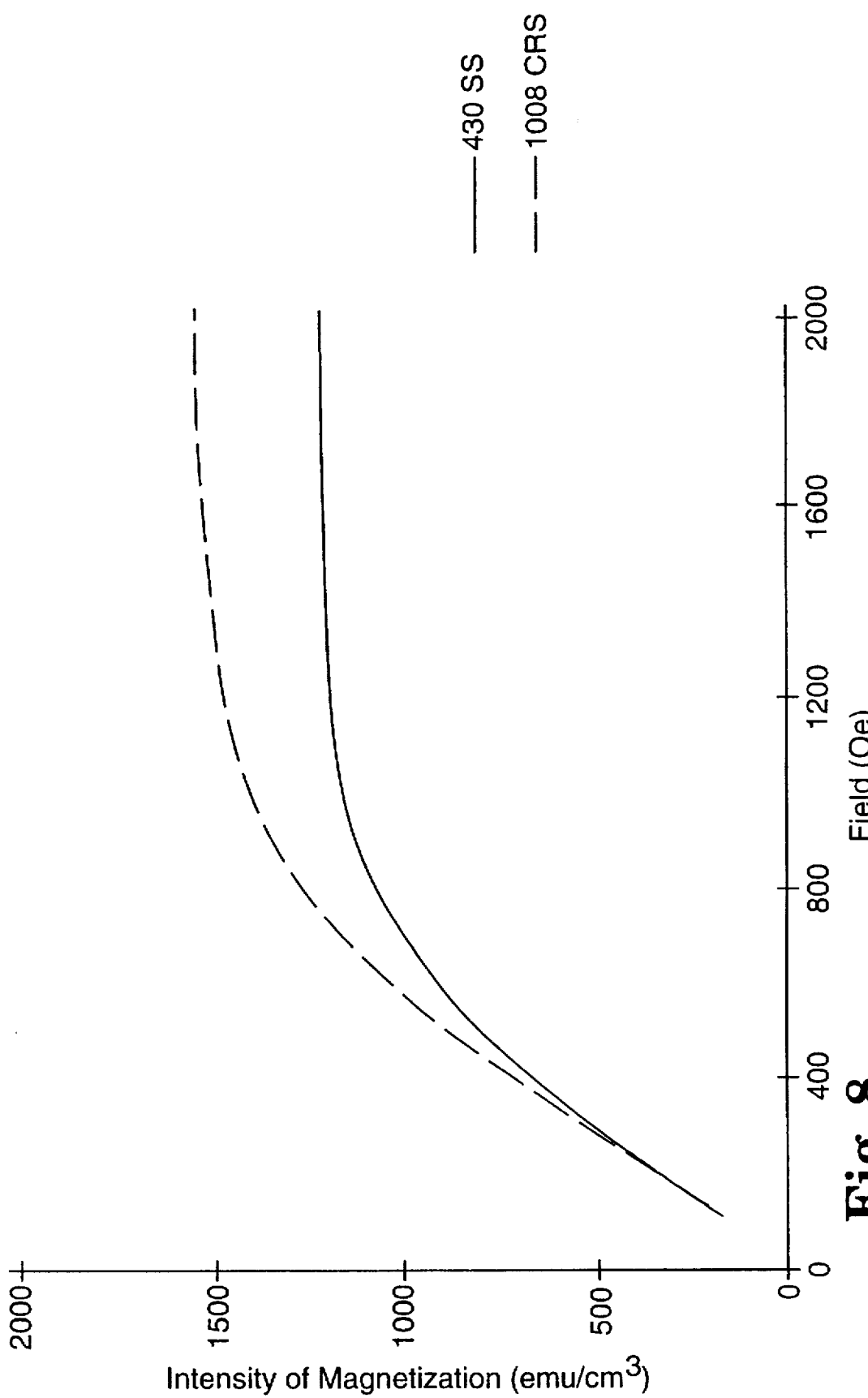
FIG. 8 is a graph of the intensity of magnetization as a function of magnetic field strength for AISI/SAE 1008 Cold-Rolled Steel and 430 Stainless Steel.

The plain carbon steel exhibits improved magnetic properties over stainless steel. Although both materials are magnetically soft (with coercivities of about 12 Oe for AISI/SAE 430 Stainless Steel and about 8 Oe for AISI/SAE 1008 Cold-Rolled Steel), the plain carbon steel exhibits increased intensity of magnetization as compared to AISI/SAE 430 Stainless Steel. These properties can be measured using a vibrating-sample magnetometer. Two typical intensity of magnetization curves for AISI/SAE 1008 Cold-Rolled Steel and 430 Stainless Steel are presented in FIG. 8.

Because of the increased intensity of magnetization, a hub manufactured from plain carbon steel will exhibit greater magnetic attraction than will a similar hub manufactured from stainless steel. Typical stainless steel micro-floppy disc hubs of AISI/SAE 430 Stainless Steel with a thickness of 0.012 inches (0.305 mm) exhibit a magnetic force of attraction of about 890 grams-force to a drive spindle with a magnetic field of about 1140 Oe as set forth in Example 1 below. In contrast, hubs 120 manufactured using plain carbon steels with the same thickness typically exhibit a magnetic force of attraction to the same drive spindle of about 1000 grams-force or more (i.e., about a 12% or greater increase). That additional magnetic attraction force contributes to improved seating of hubs on the drive spindles, thereby improving manufacturing yields in formatting tests and reliable use by consumers.

The increased magnetic clamping force attributed to the plain carbon steel (as compared to stainless steel) allows for the use of thinner hubs without significantly degrading the magnetic clamping force needed to assure proper positioning of the hub on a drive spindle. For example, hubs having a thickness of about 0.0095 inches (0.241 mm) or less typically exhibit a magnetic clamping force approximately equivalent to a thicker stainless steel hub as set forth in Example 2 below. This occurs because the increased intensity of magnetization of the plain carbon steel provides a larger magnetic attractive force for the same amount of material as compared to stainless steel (See FIG. 8). The thinner hubs provide further cost advantages for discs with plain carbon steel hubs due to reduced material costs.

Corrosion of plain carbon steels is a greater concern than with typical stainless steel hubs and the coating 128 on core 126 assists in resisting corrosion. Suitable coatings will exhibit the desired wear resistance and durability needed for micro-floppy discs that are inserted into and removed from disc drives numerous times over their useful life. The coating 128 may be provided over the entire hub 120 or over portions thereof. For example, it may be necessary to provide the coating only over those portions the hub 120 that contact the drive spindle.

Examples of suitable coatings 128 include metals and paints. Some desirable metallic coatings include tin, nickel, zinc, and chrome. Typically, the metallic coatings 128 will be electro-plated onto the plain carbon steel core 126, either before the hubs 120 are formed or, alternatively, after the hub 120 has been formed. The metallic coatings can have either bright or matte finishes.

One preferred hub 120 includes a coating 128 of tin (7C Brite Finish) with a thickness of about 15 microinches (0.38 micrometers) on a core 126 of AISI/SAE 1008 cold-rolled plain carbon steel. The thickness of the hub 120 including plating is about 0.0120 inches (0.305 mm) Suitable material having these specifications is available from U.S. Can Metal Services Company (Chicago, Ill.). The desired plated cold-rolled steel has a 7C Brite finish.

Some examples of suitable paints for coating 128 include organic paints, enamels, lacquers, plastic dip coatings, epoxies, epoxy-urethanes, phenolic resins, etc. These materials can be applied by spray coating, roll coating, dip coating, or any other suitable process.

Although only one coating 128 will typically be applied to the core 126, it will be understood that two or more coatings may be applied. These coatings may be applied over other coatings, i.e., a multi-layer coating, or on different coating on the side 121 (See FIG. 6) of the hub 120 that is hidden from view in a typical micro-floppy disc. The primary purpose for the coating 128 on that side of the hub 120 is to resist corrosion of the plain carbon steel core 126. The side 123 of the hub 120 that is exposed during handling and use could be coated with a different coating that enhances appearance, wear resistance, corrosion resistance or a number of other factors. One particularly helpful combination of coatings may include a coating of nickel on side 123 and a less-expensive coating such as tin, zinc, paint, etc. on side 121 of micro-floppy hub 120.

Figure 9:
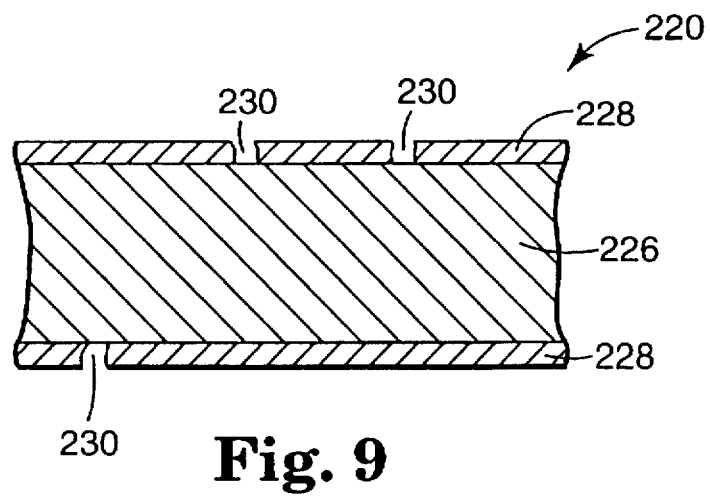
FIG. 9 is an enlarged cross-sectional view of a portion of a hub manufactured according to the present invention.

Referring to FIG. 9, an enlarged cross-section of a hub 220 is depicted which includes a core 226 of plain carbon steel as discussed above. The core 226 is coated with a primary coating 228 to enhance corrosion resistance, wear or any other desired properties. Typically, however, the hub 220 will be coated with a metallic primary coating or a paint such as those described above. One potential problem with such primary coatings, however, is their susceptibility to cracking, crazing and other surface defects 230 depicted in FIG. 9. Defects 230 can expose the plain carbon steel core 226 to ambient moisture and those exposed areas 232 of the core 226 may be corroded, thereby degrading the appearance and potentially affecting performance of the hub 220. It is important to note that the size of the defects 230 may be relatively small and may not typically be noticed by a user. The corrosion that may begin in the defects 230 could, however, enlarge the defect 230 and/or cause partial delamination of the primary coating 228 from the core 226, thereby making the defect 230 more visible over time.

As used in connection with the present invention, "corrosion" will refer either only to oxidation or, at least primarily, to oxidation of the plain carbon steel core. The oxidation rate of the exposed portions of the ferrous plain carbon steel core is increased by ambient moisture. The vapor corrosion inhibiting layer of the present invention will reduce the rate of oxidation and, in some cases, may effectively eliminate the corrosion when viewed in light of the useful life of the rotating removable data storage devices incorporating these hubs.

Figure 10:
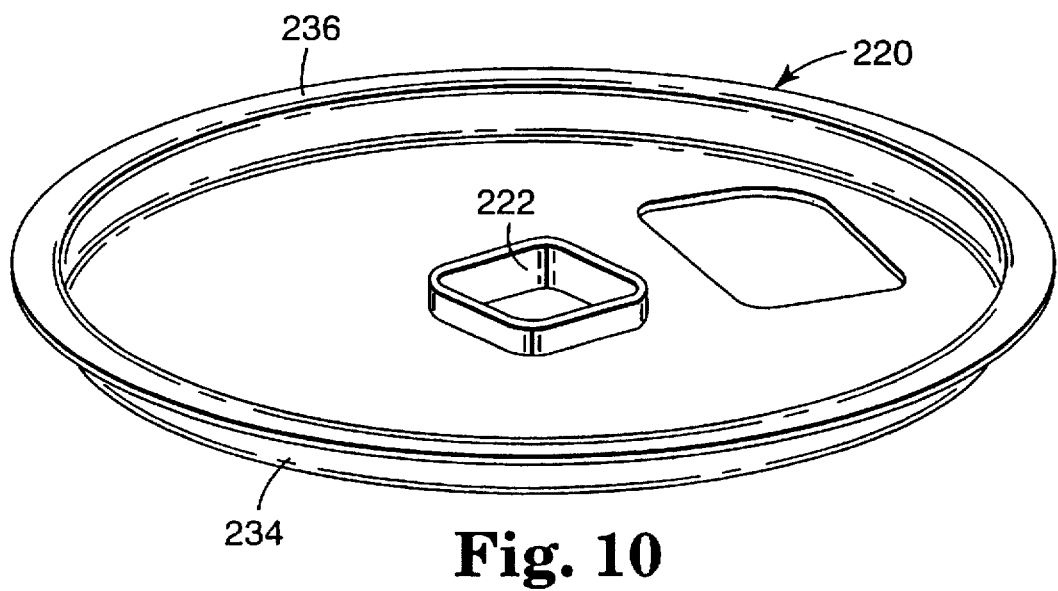
FIG. 10 is a perspective view of the hub of FIG. 9.

The defects 230 in the primary coating 228 may have a number of causes, but one typical cause with metallic plated hubs such as hub 220 is during stamping of the hub 220 from a larger sheet of plated carbon steel. Stamping hubs from preplated sheets of plain carbon steel is one economical method of manufacturing the hubs. One potential disadvantage, however, is the creation of surface defects 230 in hubs 220 during stamping, particularly in the areas being deformed such as around the center pin opening 222 (see FIG. 10). Other areas susceptible to surface defects during stamping include the shoulder 234 and flange 236 formed around the edge of the hub 220. Similar problems would be expected if the primary coating 228 were a paint, epoxy, or other non-metallic coating applied to the sheets of plain carbon steel before the hubs 220 were stamped.

In addition to stamping, however, the surface defects 230 may also occur as a result of a substandard plating or coating process that results in voids or pinholes in the primary coating. These defects could occur even if the hubs 220 were coated after stamping.

Figure 11:
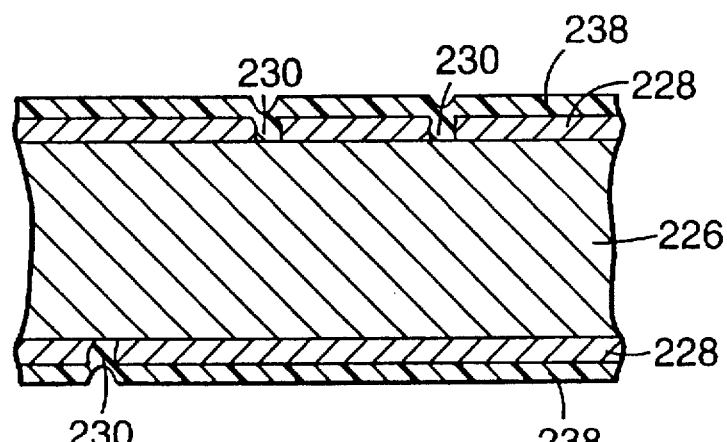
FIG. 11 is an enlarged cross-sectional view of a portion of the hub of FIG. 9 including a vapor corrosion inhibiting layer.

Corrosion at surface defects in hubs according to the present invention can, however, be reduced if a vapor corrosion inhibiting layer 238 is applied to the hubs 220 over the primary coating 228. The vapor corrosion inhibitor can prevent ambient moisture vapor from contacting the exposed areas of the core 226 in the areas of surface defects 230 as seen in FIG. 11 by forming a generally conformal layer 238 of a vapor corrosion inhibiting material that can be deposited in the surface defects 230 to protect the core 226 as well as on the primary coating 228.

The materials used for the vapor corrosion inhibiting layer 238 are preferably capable of inhibiting both anodic and cathodic attack upon the plain carbon steels used for the core 226 of hubs 220 according to the present invention. It is preferred that the vapor corrosion inhibiting layer 238 include one or more amines in addition to other components such film formers, surfactants, waxes, etc. Representative examples of such coatings and methods of providing them are described, for example, in U.S. Pat. Nos. 4,051,066; 4,275,835; 5,139,700; 5,209,869; 5,320,778; 5,344,589; 5,332,525; 5,393,457; and 5,422,187; which are hereby incorporated by reference.

The thickness of vapor corrosion inhibiting layer 238 may vary, although the nominal thickness of the layer 238 is preferably about 30 to about 40 Å (as measured by Ion Scattering Spectroscopy (ISS) or Secondary Ion Mass Spectroscopy (SIMS)). It is preferred that the vapor corrosion inhibiting layer 238 be thin enough to avoid detection by the ordinary user, i.e., the layer 238 should not be visible to the naked eye nor should it be particularly noticeable during handling of the hubs 220 during normal use. In other words, the layer 238 should not cause the hubs 220 to appear or feel oily or greasy in normal use.

The vapor corrosion inhibiting layer 238 could be applied by a number of methods including liquid immersion/spraying, vapor phase deposition, or a combination of both liquid immersion/spraying and vapor phase deposition.

In one preferred vapor phase deposition process, the amine corrosion inhibitors used for layer 238 are preferably deposited in a passive vapor deposition process in which the hubs 220 are placed in enclosures in which the corrosion inhibitor is located in a desiccant, another carrier, or in the packaging materials themselves as recited in a number of the patents listed above. Because the corrosion inhibitors vaporize under standard atmospheric conditions, they are deposited in vapor phase, on the surface of the hubs 220 during the time the hubs are present in the enclosure. It is preferred that the vapor phase deposition process be carried out for at least 24 hours to ensure adequate vapor phase deposition.

In one preferred liquid deposition process, the hubs can be immersed in an solution containing the vapor corrosion inhibiting materials (preferably one or more amines) after which they are dried. The solution may also include other components such as surfactants, film formers, waxes, etc. to assist in forming the vapor corrosion inhibiting layer 238.

Where the hubs including a vapor corrosion inhibiting layer are to be used in magnetic data storage devices such as micro-floppy discs, it is preferred that the magnetic media be attached to the hub after the vapor corrosion inhibiting layer is in place to avoid exposing and/or coating the media with the vapor corrosion inhibiting layer.

Tests performed on some representative plated steels that can be used for hubs according to the present invention show significant improvements in resistance to corrosion. Some test results are depicted graphically in FIG. 12 and the test methods used to achieve those results are described in Example 4 below. Briefly, however, the hubs 220 including a vapor corrosion inhibiting layer 238 show significant improvements in corrosion resistance.

EXAMPLES

Features and advantages of the coated plain carbon steel micro-floppy disc hubs according to the present invention are further illustrated in the examples. It is recognized, however, that while the examples serve this purpose, the particular plain carbon steels and coating used, as well as other conditions and details, are not to be construed in a manner that would unduly limit the scope of this invention. The following tests were used to evaluate plain carbon steel micro-floppy disc hubs of the present invention.

MAGNETIC CLAMPING FORCE TEST

Micro-floppy disc hubs manufactured with the dimensions set forth in ANSI x3.171:1989 were mounted on an Optical Hub Pushoff Tester (Model NTS4700A, Kato Spring Works Co. Ltd., Japan (Ser. No. 910613-2)). The drive spindle incorporated in this machine had a magnetic field measured near its magnetic poles of about 1140 Oe as measured with a hand-held gaussmeter located near the poles of the magnets in the spindle.

To determine the magnetic clamping force, the hubs were placed on the test spindle (subject to the magnetic attractive force) and the spindle was automatically lowered at a constant rate. During movement of the spindle, the movement of the hub is restrained by a retaining ring such that the spindle pulls away from the hub (as restrained by the retaining ring). As the spindle moves away from the hub, the maximum magnetic clamping force is recorded by a load cell attached to the spindle, thereby providing the maximum magnetic clamping force as used in connection with the present invention.

Example 1

Micro-floppy disc hubs were manufactured by stamping from sheet stock with a nominal thickness of about 0.012 inches (0.305 mm) according to the dimensions set forth in ANSI x3.171:1989. Table 1 lists the various materials used for the core and coating (if any) along with the Magnetic Clamping Force as measured according to the test described above (using a spindle having a magnetic field measured near its magnetic poles of about 1140 Oe as measured with a handheld gaussmeter located near the poles of the magnets in the spindle).

The AISI/SAE 430 Stainless Steel used for the tested hubs was purchased from Allegheny Ludlum Steel, Wallingford, Conn. The epoxy used to coat some of the 430 Stainless Steel hubs was an epoxy-urethane.

The material for the hubs manufactured of AISI/SAE 1008 steel were purchased from U.S. Can Metal Services (Chicago, Ill.) as 1008 Cold Rolled Steel, 0.0118±0.0006 inches thick (107 pound/base box ±5% or 300±3.2 micrometers), T5 Temper (30T scale). The pre-plated (i.e., plated before stamping the hubs) tin coating was 0.25 pound/base box Brite 7C Tin Plate (0.11 pound/base box minimum per side). The matte tin coating was a No. 5 matte tin finish and the nickel was electroless post-plated (i.e., plated after stamping) using Watts Brite nickel.

TABLE 1

| Core Material | Coating | Coating Thickness (μm) | Clamping Force (grams-force) | Std. Dev. | No. of Tests |
|---|---|---|---|---|---|
| 430 Stainless Steel | None | — | 889 | 8.6 | 20 |
| 430 Stainless Steel | Chrome | 3.81 | 855 | 3 | 2 |
| 430 Stainless Steel | Epoxy | 1.91 | 802 | 36.4 | 10 |
| 1008 Steel | None | — | 1024 | 23.6 | 20 |
| Same | Matte Tin | 0.381 | 1005 | 26.3 | 30 |
| Same | Brite Tin | 0.381 | 1022 | 17 | 7 |
| Same | Nickel | 2.29 | 1058 | 11.2 | 10 |

Example 2

Micro-floppy disc hubs were manufactured by stamping from sheet stock according to the dimensions set forth in ANSI x3.171:1989 with the exception that the sheet stock had a nominal thickness of about 0.0095 inches (0.241 mm). Table 2 lists the various materials used for the core and coating (if any) along with the Magnetic Clamping Force as measured according to the test described above.

TABLE 2

| Core Material | Coating | Coating Thickness (μm) | Clamping Force (grams-force) | Std. Dev. | No. of Tests |
| --- | --- | --- | --- | --- | --- |
| 430 Stainless Steel | None | — | 736 | 8.6 | 10 |
| 1008 Steel | Brite Tin | 0.381 | 878 | 22.0 | 12 |

Example 3

Micro-floppy disc hubs were manufactured by stamping from sheet stock according to the dimensions set forth in ANSI x3.171:1989 with the exception that the sheet stock had a nominal thickness of about 0.0080 inches (0.203 mm). Table 3 lists the various materials used for the core and coating (if any) along with the Magnetic Clamping Force as measured according to the test described above.

TABLE 3

| Core Material | Coating | Coating Thickness (μm) | Clamping Force (grams-force) | Std. Dev. | No. of Tests |
| --- | --- | --- | --- | --- | --- |
| 430 Stainless Steel | None | — | 649 | 19.5 | 10 |
| 1008 Cold-Rolled Steel | Brite Tin | 0.381 | 813 | 7.6 | 4 |

Example 4

Micro-floppy disc hubs were manufactured by stamping from sheet stock with a nominal thickness of about 0.012 inches (0.305 mm) according to the dimensions set forth in ANSI x3.171:1989. The sheet stock was AISI/SAE 1008 steel purchased from U.S. Can Metal Services (Chicago, Ill.) as 1008 Cold Rolled Steel, 0.0118±0.0006 inches thick (107 pound/base box ±5% or 300±3.2 micrometers), T5 Temper (30T scale). The sheet stock was pre-plated (i.e., plated before stamping the hubs) with a tin coating, specified as 0.25 pound/base box Brite 7C Tin Plate (0.11 pound/base box minimum per side).

Some of the hubs were retained as controls (i.e., not treated with a vapor corrosion inhibitor), while others were treated with a corrosion inhibitor according to the following methods.

Group 1:

A first group of hubs (designated Group 1) were prepared by liquid immersion and vapor phase deposition of vapor corrosion inhibiting layer as follows.

Aqueous solutions of a vapor corrosion inhibitor (VCI) material were provided in concentrations ranging from 0.5% to 2% (by weight). The vapor corrosion inhibitor was VCI-379 purchased from Cortec Corporation, White Bear Lake, Minn. In addition to the amine vapor corrosion inhibitor, the VCI-379 also includes suitable film formers, surfactants, waxes, and other components required to assist in depositing a vapor corrosion inhibiting layer including an amine.

Freshly stamped hubs as described above were cleaned by aqueous washing in which the hubs were immersed in a high pH (about 8.5 to about 10) aqueous detergent solution that was heated to 140±5° F. (60±3° C.). The hubs were agitated in the detergent solution for 2–4 minutes after which the hubs were immersed in a heated rinse water tank (140±5° F. or 60±3° C.) and agitated for 2–4 minutes. Alternatively, the hubs could be cleaned in a heated solution of trichloroethylene.

The cleaned hubs were then immersed and agitated for 1–3 minutes in the aqueous solution including the vapor corrosion inhibitor material. After being removed from the vapor corrosion inhibitor solution, the hubs were air dried in an oven at 210±10° F. (99±5° C.) for 15–20 minutes after which they were allowed to cool to room temperature.

The hubs were then tested. The results of tests on this group of hubs is depicted in Table 4 below as Group 1 along with the variables used in developing the Eyring Acceleration Model used to arrive at the expected survival rate.

Group 2:

A second group of the hubs (designated as Group 2) was subjected only to vapor phase deposition of the vapor corrosion inhibitor as discussed below.

Freshly stamped hubs as described above were cleaned by aqueous washing as described above for Group 1. The cleaned hubs were then dried and placed in plastic bags formed with a vapor corrosion inhibitor in the packaging material. The material used for the bags was VCI-126, available from Cortec Corporation. Also inserted into each bag was a vapor phase emitter containing an active amine that vaporizes at standard atmospheric conditions. The vapor phase emitter pouches used were designated 1-MUL, also available from Cortec Corporation.

The hubs were retained in the bags for at least 24 hours after which they were removed for environmental testing. The results of tests on this group of hubs is depicted in Table 4 below as Group 2 along with the variables used in developing the Eyring Acceleration Model used to arrive at the expected survival rate.

Group 3:

A third group of the hubs (designated as Group 3) was maintained as a control group. The hubs in the control group were cleaned by aqueous washing as described above for Group 1. The hubs were then subjected to environmental testing. The results of tests on this group of hubs is depicted in Table 4 below as Group 3 along with the variables used in developing the Eyring Acceleration Model used to arrive at the expected survival rate.

TABLE 4

| Group | A | ΔH | B | Scale | Shape | Years |
| --- | --- | --- | --- | --- | --- | --- |
| 1 | −9.3 | .72 | −10.9 | 61 | 1.61 | 9.6 |
| 2 | −4.4 | .48 | −5.5 | 14 | 3.44 | 6.8 |
| 3 | −17.2 | .80 | −7.0 | 4 | 1.35 | 0.4 |

Corrosion Testing of Groups 1–3

The different groups of hubs prepared as described above were then placed in environmental testing chambers and subjected to controlled conditions to collect the data needed to develop an Eyring Acceleration Model for each group.

The tests were conducted by placing the hubs in an environmental testing chamber in which both temperature and humidity could be controlled. The data collected was used to develop an Eyring Acceleration Model of the expected life of representative plain carbon steel hubs having a primary coating and vapor corrosion inhibiting layer, as well as control groups of hubs having no additional vapor corrosion inhibiting layer. For the purposes of the tests, 0.049" (1.24 mm) in any direction on the surface of the material was established as the maximum size for a defect with corrosion, at which point the part was determined to have reach the point of failure.

Figure 12:
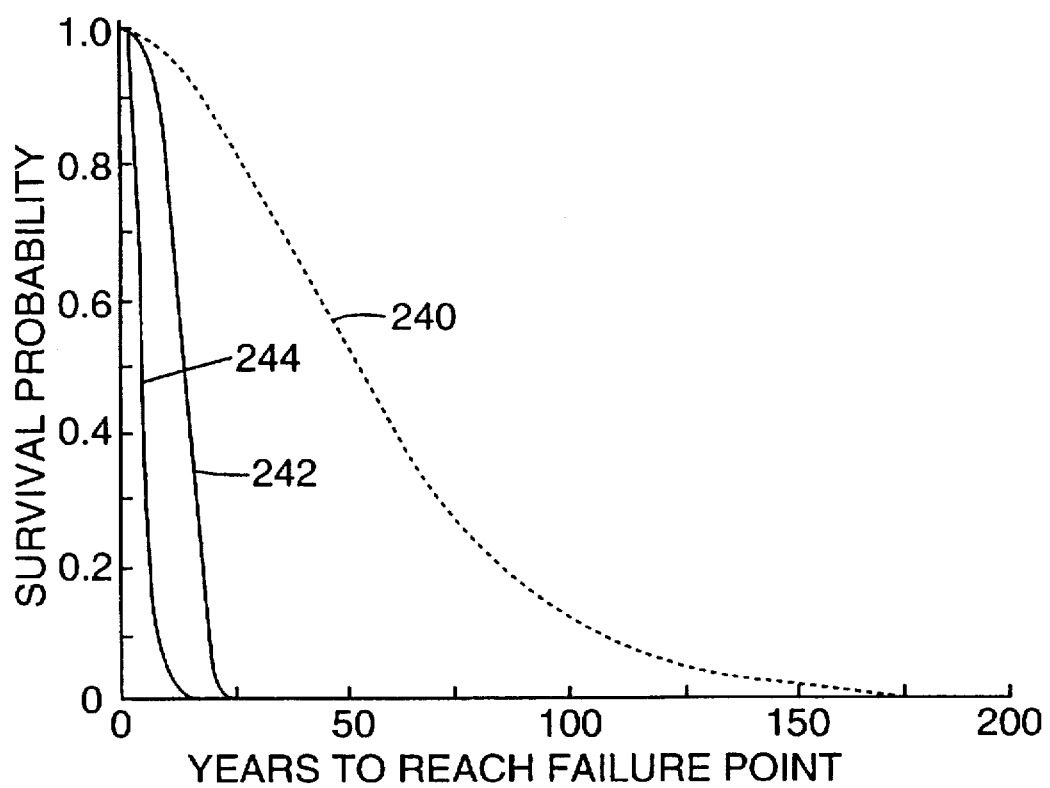
FIG. 12 is a graph of the results of corrosion testing of materials used to manufacture hubs according to the present invention.

The results of the corrosion testing for conditions of a temperature of 25° C. and 50% Relative Humidity are depicted in Table 4 and in FIG. 12. They show the improvements in expected survival of hubs manufactured with a vapor corrosion inhibitor according to the present invention. The results shown in the years column of Table 4 are the point at which 5% of the hubs can be expected to have developed defects having the size of 0.049 inches (1.24 mm). This is also the point at which 95% of the hubs can be expected to have survived, i.e., the surviving hubs would not have developed defects having a size of 0.049 inches (1.24 mm). FIG. 12 is a graphical representation of the results of the Eyring Acceleration Model including a curve 240 for Group 1, curve 242 for Group 2, and curve 244 for Group 3.

Various modifications and alterations of this invention will become apparent to those skilled in the art without departing from the scope of this invention, and it should be understood that this invention is not to be unduly limited to the illustrative embodiments set forth herein.

What is claimed is:

1. A hub for a rotating removable data storage device comprising:
   a) a core comprising plain carbon steel having about 0.2% or less carbon; and
   b) a coating on at least a portion of the core.

2. The hub of claim 1, wherein the coating is selected from the group consisting of tin, nickel, zinc, chrome, paints, epoxies, epoxy-urethanes, phenolic resins, and combinations thereof.

3. The hub of claim 1, further comprising a vapor corrosion inhibiting layer on the coating.

4. The hub of claim 1, wherein the hub has a thickness of about 0.241 millimeters or less.

5. The hub of claim 1, wherein the coating comprises a plating of tin or nickel material.

6. The hub of claim 5, wherein the plating of tin or nickel material has a thickness of about 0.38 micrometers.

7. The hub of claim 1, wherein the core produces a magnetic force of attraction on the order of about 1,000 grams-force.

8. A hub for a rotating removable data storage device comprising:
   a) a core comprising plain carbon steel having about 0.2% or less carbon; and
   b) a coating on at least a portion of the core, the coating selected from the group consisting of tin, nickel, zinc, chrome, paints, epoxies, epoxy-urethanes, phenolic resins, and combinations thereof, wherein the hub has a thickness of about 0.241 millimeters or less.

9. The hub of claim 8, wherein the coating comprises a plating of tin or nickel material.

10. The hub of claim 9, wherein the plating of tin or nickel material has a thickness of about 0.38 micrometers.

11. The hub of claim 8, wherein the core produces a magnetic force of attraction on the order of about 1,000 grams-force.

12. A hub for a micro-floppy magnetic data storage disc comprising:
   a) a core comprising plain carbon steel having about 0.2% or less carbon; and
   b) a coating on at least a portion of the core.

13. The hub of claim 12, wherein the coating is selected from the group consisting of tin, nickel, zinc, chrome, paints, epoxies, epoxy-urethanes, phenolic resins, and combinations thereof.

14. The hub of claim 12, further comprising a vapor corrosion inhibiting layer on the coating.

15. The hub of claim 12, wherein the coating comprises a plating of tin or nickel material.

16. The hub of claim 15, wherein the plating of tin or nickel material has a thickness of about 0.38 micrometers.

17. The hub of claim 12, wherein the core produces a magnetic force of attraction on the order of about 1,000 grams-force.

18. A micro-floppy magnetic data storage disc comprising:
   a) an annular ring of magnetic recording media; and
   b) a hub located within a central opening in the recording media and secured thereto, the hub comprising:
      1) a core comprising plain carbon steel having about 0.2% or less carbon; and
      2) a coating on at least a portion of the core.

19. The disc of claim 18, wherein the coating is selected from the group consisting of tin, nickel, zinc, chrome, paints, epoxies, epoxy-urethanes, phenolic resins, and combinations thereof.

20. The disc of claim 18, wherein the hub has a thickness of about 0.241 millimeters or less.

21. The disc of claim 18, further comprising a vapor corrosion inhibiting layer on the coating.

22. The disc of claim 18, wherein the coating comprises a plating of tin or nickel material.

23. The disc of claim 18, wherein the core produces a magnetic force of attraction on the order of about 1,000 grams-force.

24. A hub for a rotating removable data storage device comprising:
   a) a core comprising plain carbon steel having about 0.5% or less carbon;
   b) a primary coating on at least a portion of the core; and
   c) a vapor corrosion inhibiting layer on the primary coating.

25. A hub according to claim 24, wherein the primary coating comprises a metallic plating.

26. A hub according to claim 24, wherein the vapor corrosion inhibiting layer comprises an amine.

27. The hub of claim 24, wherein the hub has a thickness of about 0.241 millimeters or less.

28. The hub of claim 24, wherein the plain carbon steel comprises about 0.5% or less carbon.

29. The hub of claim 24, wherein the plain carbon steel comprises about 0.2% or less carbon.

30. The hub of claim 25, wherein the metallic plating comprises tin or nickel material.

31. A hub for a micro-floppy magnetic data storage disc comprising:
   a) a core comprising plain carbon steel having about 0.5% or less carbon
   b) a primary coating on at least a portion of the core; and
   c) a vapor corrosion inhibiting layer on the primary coating.

32. A hub according to claim 31, wherein the primary coating comprises a metallic plating.

33. A hub according to claim 31, wherein the vapor corrosion inhibiting layer comprises an amine.

34. The hub of claim 32, wherein the metallic plating comprises tin or nickel material.

35. The hub of claim 31, wherein the core produces a magnetic force of attraction on the order of about 1,000 grams-force.

* * * * *

UNITED STATES PATENT AND TRADEMARK OFFICE
CERTIFICATE OF CORRECTION

PATENT NO. : 5,896,241

DATED : April 20, 1999

INVENTOR(S) : Hilton et al.

It is certified that error appears in the above-identified patent and that said Letters Patent is hereby corrected as shown below:

On the front page, under U.S. Patent Documents, the following should be added:

| | | |
|---|---|---|
| --4,063,295 | 12/77 | Mann et al. |
| 4,068,271 | 01/78 | Kok |
| 4,244,788 | 01/81 | Faulkner |
| 4,757,412 | 07/88 | Iizuka et al. |
| 4,868,699 | 09/89 | Kingsbury et al. |
| 4,967,184 | 10/90 | Regelsberger |
| 5,289,456 | 02/94 | Takahashi-- |

On the front page, after "Foreign Patent Documents," the following should be added:

--OTHER DOCUMENTS

"Data Interchange on 90 mm Flexible Disk Cartridges Using MFM Recording at 15916 ftprad on 80 Tracks on Each Side," European Computer Manufacturers Association, No. ECMA/TC19/87/21, pp. 1-43 (September 1987)

"Flexible Magnetic Media for Digital Data Interchange," SC 11 Secretariat, No. ISO/IEC JTC 1/SC 11 N 963, pp. 1-37 and 1-13 (June 13, 1989)

UNITED STATES PATENT AND TRADEMARK OFFICE
CERTIFICATE OF CORRECTION

PATENT NO. : 5,896,241
DATED : April 20, 1999
INVENTOR(S) : Hilton et al.

Page 2 of 2

It is certified that error appears in the above-identified patent and that said Letters Patent is hereby corrected as shown below:

"One- and Two-Sided, High-Density, Unformatted, 90-mm (3.5in), 5,3-tpmm (135-tpi), Flexible Disk Cartridge for 15 916 bpr Use – General, Physical, and Magnetic Requirements," American National Standards Institute, ANSI X3.171-1989, pp. 6-28 (1989)--

Signed and Sealed this

Second Day of January, 2001

Attest:

Q. TODD DICKINSON

*Attesting Officer*                *Commissioner of Patents and Trademarks*